Figure 3:
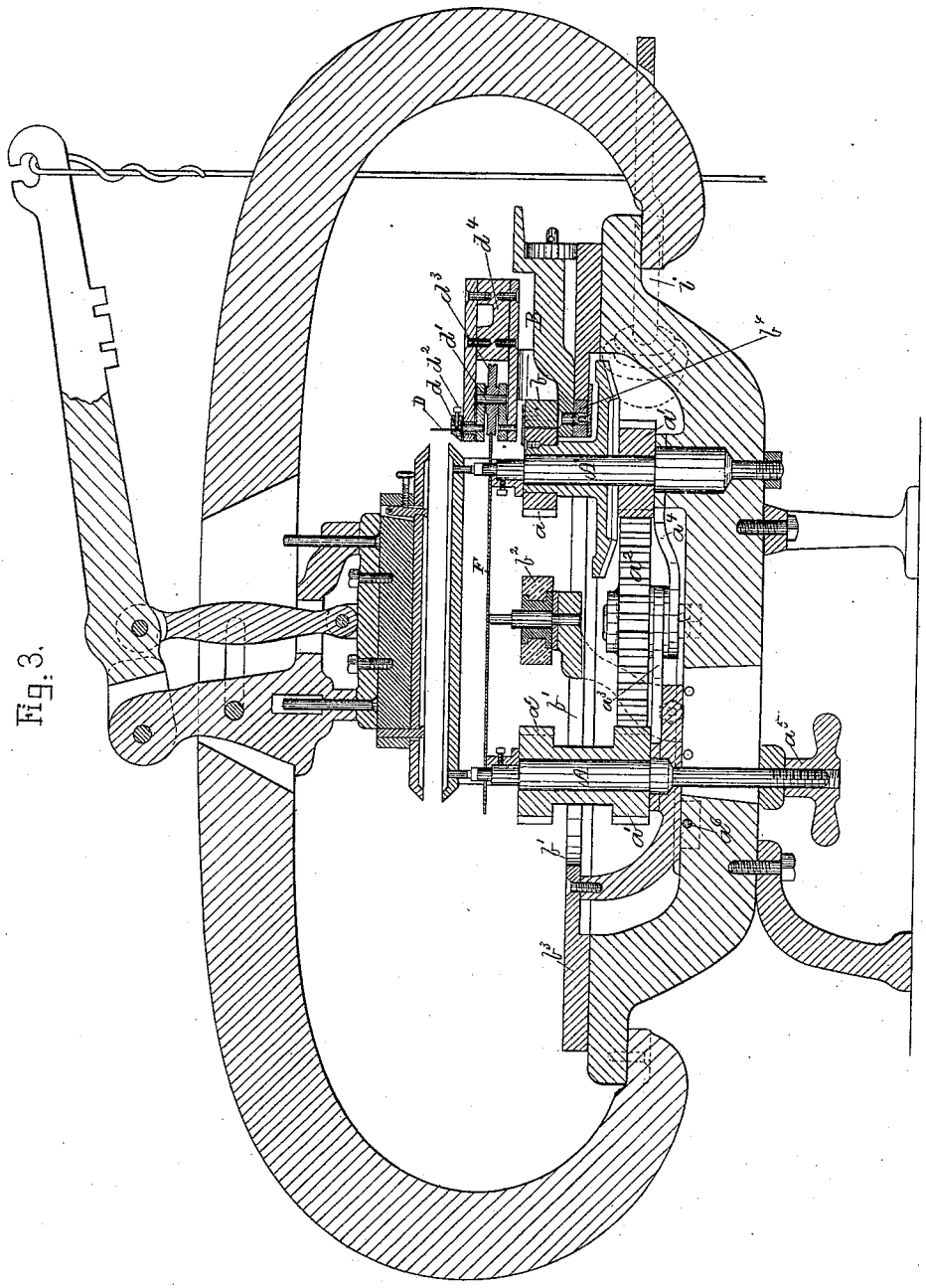

(No Model.)  2 Sheets—Sheet 1.
D. F. HARTFORD.
SOLE CUTTING MACHINE.
No. 309,850. Patented Dec. 30, 1884.
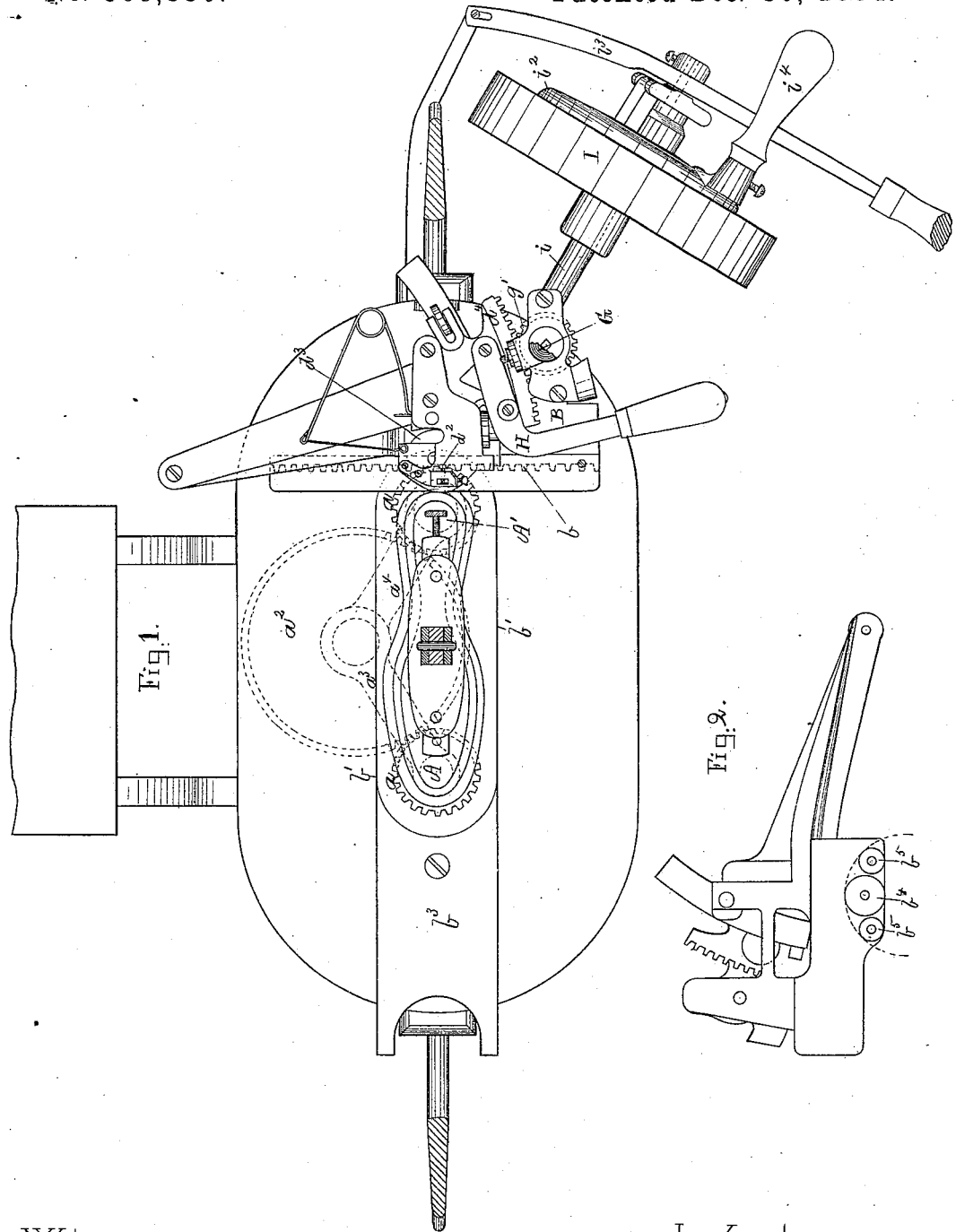
Witnesses.
Lauritz W. Möller
John R. Snow.
Inventor.
David F. Hartford
by his attorney,
J. E. Maynadier (No Model.)

2 Sheets—Sheet 2.

D. F. HARTFORD.
SOLE CUTTING MACHINE.

No. 309,850.          Patented Dec. 30, 1884.

Witnesses.
Lauritz W. Möller
John R. Snow

Inventor.
David F. Hartford
by his attorney,
J. E. Maynadier

United States Patent Office.

DAVID F. HARTFORD, OF BOSTON, MASSACHUSETTS.

SOLE-CUTTING MACHINE.

SPECIFICATION forming part of Letters Patent No. 309,850, dated December 30, 1884.

Application filed May 19, 1884. (No model.)

*To all whom it may concern:*

Be it known that I, DAVID F. HARTFORD, of Boston, in the county of Suffolk and State of Massachusetts, have invented certain new and useful Improvements in Sole-Cutting Machines, of which the following is a specification.

The objects of my invention are to adapt the machine for cutting soles from a continuous strip of leather, and to facilitate the adjustments to adapt the machine to different-sized soles.

To attain these objects my invention consists, mainly, in the combination of pinions with a rack on the knife-carriage, and in certain modifications of the knife and its carriage to admit of cutting soles from a sheet or strip, substantially as hereinafter described, reference being had to the accompanying drawings, in which—

Figure 1 is a plan of my improved machine, the support for the upper clamp being removed. Fig. 2 is a bottom view of the knife-carrier, and Fig. 3 is a central longitudinal section through the machine.

In the machine shown in my Patent No. 274,739, of 1883, the knife-carrier is attached to and propelled by a chain meshing with gears on the clamp-supporting posts, and to adapt the machine for different-sized soles it is necessary to disconnect the chain and remove or insert one or more links. In my improved machine such changes are made by simply moving the clamp-supporting posts toward or from each other. The clamp-supporting posts A A' are each provided with two pinions, $a$ $a'$, which are connected and turn together. The upper pinions, $a$, mesh with a rack, $b$, secured to the knife-carrier B, which is guided by a track, $b'$, and the wheels $b^4$ $b^5$. (See Fig. 2.) The central wheel, $b^4$, acts alone on the straight sides of the track $b'$. The side wheels, $b^5$, act with the central wheel, $b^4$, to guide and steady the carriage around the semicircular rails of the track $b'$. For a part of the time, while the knife-carrier is on the straight sides of its guide-track $b'$, both of the pinions $a$ are in mesh with its rack—that is, one pinion engages with it before it leaves the other. While the knife-carrier is rounding the semicircular ends of its guide-track $b'$ there is no travel of the rack $b$ past the pinion; but the rack is then moved with the pinion, because the tooth of the pinion and the tooth of the rack with which it is engaged both move through an arc of one hundred and eighty degrees in the same time, while, obviously, along the straight sides of its track it is directly proportionate to the diameter of the pinions. Therefore any desired speed may be given to the knife by increasing the diameters of the pinions without danger of throwing it around the ends with objectionable violence. As soon as the rack $b$ is turned one hundred and eighty degrees by one pinion it is caught by an elastic roll, $b^2$, which not only prevents shock, but also prevents the end of the rack from passing beyond the point at which it meshes with the other pinion. For the shortest soles the pinions $a$ may be so near to each other that the end of the rack will not fall inside of one when it is turned by the other. The elastic roll $b^2$ in such cases prevents the teeth of the rack from bottoming on the pinion. The lower pinions, $a'$, mesh with an intermediate gear, $a^2$, which is connected by links $a^3$ $a^4$ to the posts A A'. These links are loose on the shaft of the gear $a^2$, and on the posts A A'. The intermediate gear, $a^2$, causes both pinions to revolve in the same direction, and is moved toward or from a line drawn through the posts A A', as the posts are moved farther apart or nearer together, by means of the links $a^3$ $a^4$, which links also retain the gear $a^2$ always in mesh with the pinions $a$. Obviously, but one of the posts need be moved to make the desired changes. The post A is in this instance the movable one, and to it is attached a plate, $b^3$, which forms one of the semicircular ends of the guide-track $b'$. The post A moves in a slot in the frame, and is secured in any desired position by means of a nut, $a^5$, a pin, $a^6$, and a series of holes in the frame to designate the proper positions. The driving-gear is attached to the post A', and its resistance prevents its pinion $a'$ from turning, and consequently the intermediate gear, $a^2$, rolls on it when the post A is moved and adapts itself to the changed relative positions of the pinions $a'$.

The facility with which changes can be made by pulling out the pin $a^6$, loosening the nut $a^5$, moving the post A, inserting the pin in another hole, and tightening the nut will be apparent.

My present machine cuts soles from a sheet or strip of leather, the knife-carrier being adapted to pass below the leather strip and the top of the knife free. The knife D has a tang, $d$, at one end only, and its cutting-edge extends from the tang to the top of the blade. The knife is secured to the shaft of a crank, $d'$, by means of the tang $d$ and a set-screw, $d^2$, so as to bring its cutting-edge in proper relation to the axis of the crank $d'$, on the wrist-pin of which is mounted the wheel $d^3$, which bears against the guide-pattern F, and so turns the crank $d'$ as to keep the cutting-edge of the knife always in proper position, however the contour of the pattern may vary. A coil-spring, G, acts on a pinion, $g$, which meshes with a rack on a carriage, $d^4$, on which the crank $d'$ is mounted, and which runs on the main carrier B. The wheel $d^3$ is thereby kept in contact with the edge of the guide-pattern F and made to follow its contour. The carriage $d^4$ is moved toward or from the pattern F, to bring the knife in position for cutting out a sole, or to remove the knife when moving up the strip of leather, by means of a handle, H, located below the top of the lower clamp on which the leather strip rests. By thus arranging the handle H all parts of the carrier are brought below the top of the lower clamp, so that the knife-carrier can pass beneath a long strip of leather held by the clamps, while the upwardly-projecting knife cuts a sole therefrom, thereby obviating the necessity of cutting the leather into sole-blanks but little larger than the clamps, to be rounded by the knife, as heretofore. A loose pulley, I, is driven by a belt, and motion is communicated from it to the driving-shaft $i$ by means of a clutch-wheel, $i^2$, operated by the lever $i^3$, and splined on the shaft $i$.

The machine may be driven by hand by removing the lever $i^3$ and attaching a handle, $i^4$, to the clutch-wheel $i^2$. Obviously, the handle $i^4$ is detached when the lever $i^3$ is put on.

I claim as my invention—

1. The combination, with the knife-carrier provided with a rack and a track, of driving-pinions, as arranged, near either end of the track, so that one pinion will engage with the rack before the other pinion leaves it, substantially as set forth.

2. The combination of the clamp-supporting posts, driving-pinions mounted on the posts, and an intermediate movable gear-wheel linked to the posts, so as to be kept in position to mesh with the pinions as their relative positions are varied, substantially as and for the purpose set forth.

3. In a sole-cutting machine, the combination of the leather-holding clamps, the track around the clamps, a knife-carrier arranged to pass clear of a strip of leather when held by the clamps, the rack and pinions for propelling the knife-carrier on the track, and a knife attached at one end to the carrier and having its other free end projecting therefrom, whereby soles may be cut from a long strip of leather, substantially as hereinbefore set forth.

4. In a sole-cutting machine adapted to receive leather-holding clamps of different sizes, a track for guiding the knife around the clamps, having its ends adjustable, whereby the track can be adapted to any size of holding-clamp, substantially as hereinbefore set forth.

5. In combination, the posts A A', the plate $b^3$, fast to post A, and the slotted bed-plate, substantially as described.

DAVID F. HARTFORD.

Witnesses:
W. A. COPELAND,
J. R. SNOW.